(No Model.) 2 Sheets—Sheet 1.
W. S. JONES.
PLANTER AND FERTILIZER DISTRIBUTING ATTACHMENT FOR PLOWS.
No. 445,852. Patented Feb. 3, 1891.
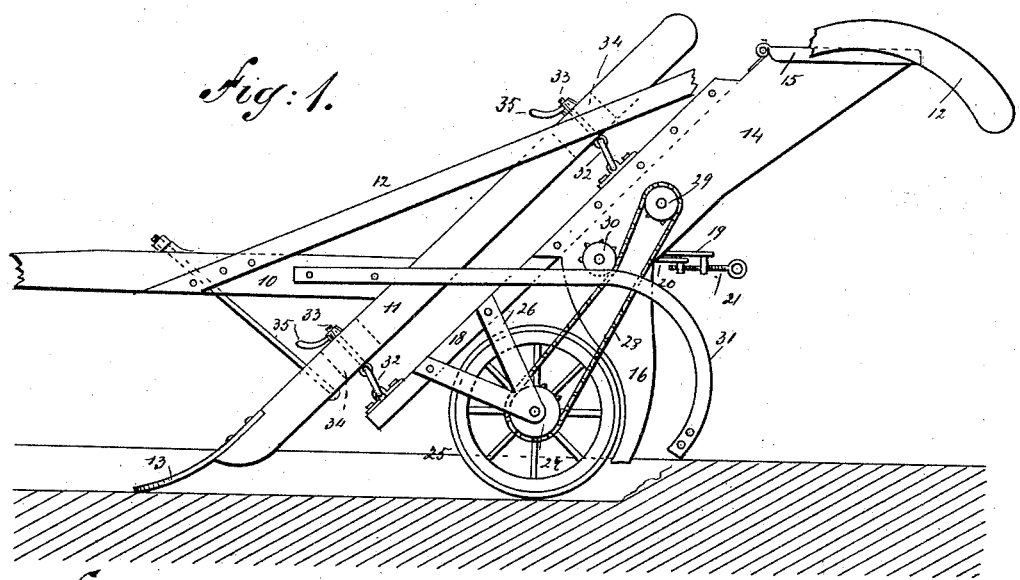
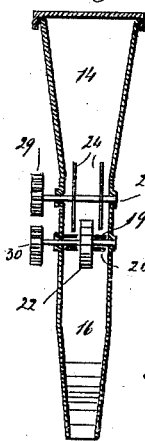
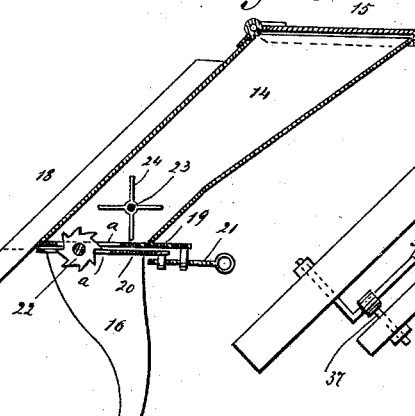
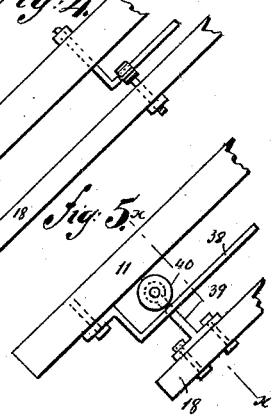
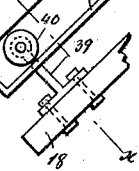
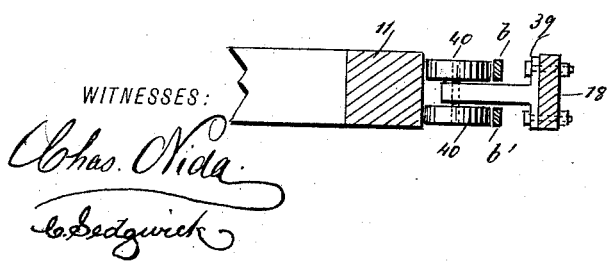
WITNESSES:
Chas. Nida
C. Sedgwick
INVENTOR:
W. S. Jones
BY
Munn & Co.
ATTORNEYS (No Model.) 2 Sheets—Sheet 2.

W. S. JONES.
PLANTER AND FERTILIZER DISTRIBUTING ATTACHMENT FOR PLOWS.

No. 445,852. Patented Feb. 3, 1891.

WITNESSES:
Chas. Niola
C. Sedgwick

INVENTOR:
W. S. Jones
BY Munn & Co
ATTORNEYS

UNITED STATES PATENT OFFICE.

WASHINGTON S. JONES, OF MERIDIAN, MISSISSIPPI, ASSIGNOR TO HIMSELF, ALONZO A. DILLEHAY, AND JOHN T. O'FERRALL, ALL OF SAME PLACE.

PLANTER AND FERTILIZER-DISTRIBUTING ATTACHMENT FOR PLOWS.

SPECIFICATION forming part of Letters Patent No. 445,852, dated February 3, 1891.

Application filed August 1, 1890. Serial No. 360,697. (No model.)

*To all whom it may concern:*

Be it known that I, WASHINGTON S. JONES, of Meridian, in the county of Lauderdale and State of Mississippi, have invented a new and Improved Planter and Fertilizer-Distributing Attachment to Plows, of which the following is a full, clear, and exact description.

My invention relates to an improved planter and fertilizer, and has for its object to provide an implement complete in itself which can be conveniently and expeditiously attached to any plow-stock for use in connection therewith; and a further object of the invention is to so connect the implement with the plow that it will have a maximum range of self-adjustment.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 7:
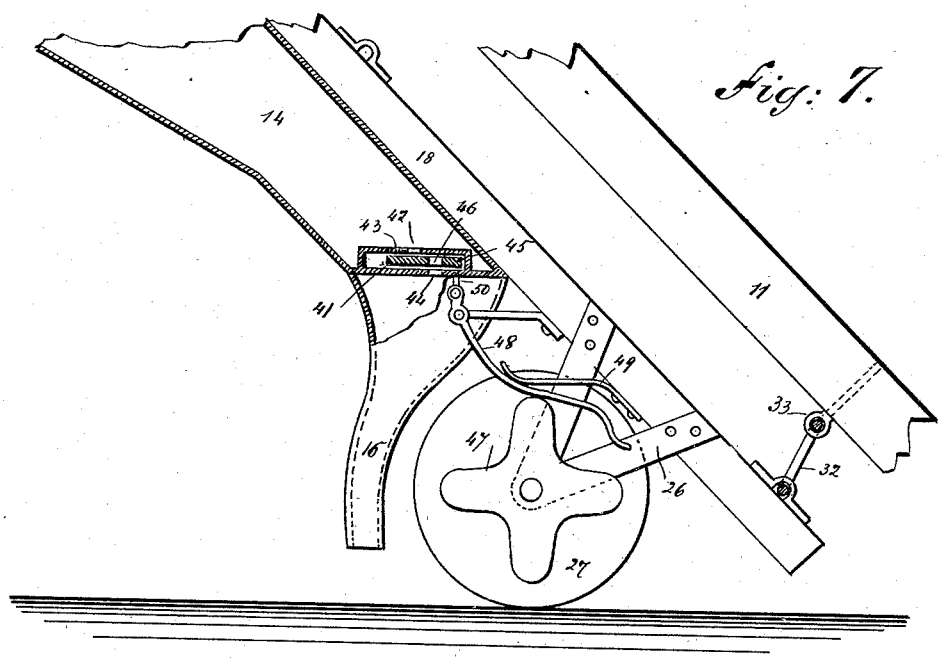
Figure 8:
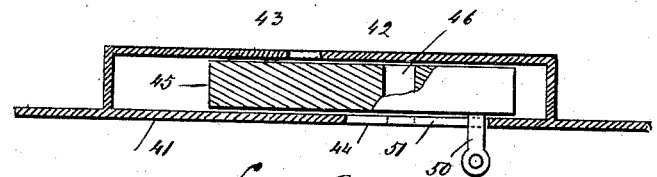
Figure 9:
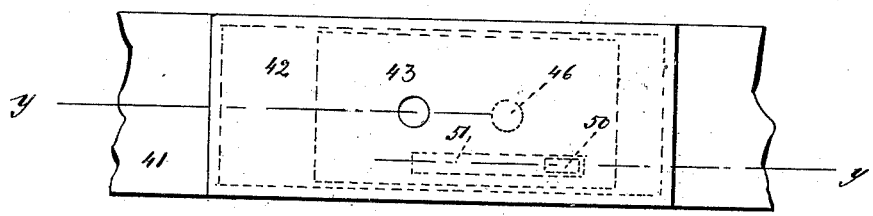

Figure 1 is a side elevation of the implement employed as a fertilizer and attached to a plow. Fig. 2 is a vertical section through the reservoir and feed-spout of the implement, and Fig. 3 is a similar section taken at a right angle to the section illustrated in Fig. 2. Figs. 4 and 5 illustrate different devices for attaching the implement to the plow. Fig. 6 is a section on line *x x* of Fig. 5. Fig. 7 is a partial side elevation and vertical section of the form of implement utilized for planting. Fig. 8 is a central vertical section through the drop-slide of the planter and the box in which the slide has movement, the section being taken on line *y y* of Fig. 9; and Fig. 9 is a plan view of the box, the slide being illustrated in dotted lines.

The plow may be of any suitable or approved construction, that illustrated consisting of a beam 10, a stock 11, attached to the beam and extending at an inclination rearward and above the beam, handles 12, attached to the beam and extending rearward at each side of the stock, and a plowshare or plate 13, secured to the lower extremity of the stock.

The body of the implement consists, mainly, of a box-like reservoir 14, the sides whereof are inclined, the inclination of the sides being made to correspond to the inclination of the plow-stock. The reservoir 14 is provided with a lid or cover 15, hinged or otherwise attached to its upper edge, and the lower portion of the body consists of a rearwardly and downwardly curved spout 16, having communication with the reservoir 14 above it. To the front inclined side of the body a downwardly-projecting bar or beam 18 is rigidly secured, and the said body is attached to the stock of the plow through the medium of said beam and of devices to be hereinafter described.

The spout 16 is separated from the reservoir 14 by two removable slide-plates 19 and 20. The slide-plate 19, which is the upper one, is held stationary in the body and extends through from side to side and preferably beyond the rear side, the outer projecting end being provided with a downwardly-extending lug in which a horizontal adjusting-screw 21 is capable of movement. The lower slide-plate 20 is capable of lateral movement, and such movement is imparted to the slide-plate, when desired, through the medium of the adjusting-screw 21, which is connected therewith as is best shown in Fig. 2. Each slide-plate 19 and 20 is provided with a longitudinal slot *a*, and at the junction of the spout with the reservoir 14 of the body a feed-wheel 22 is journaled, which wheel is so located as to revolve in the slots *a* of the slides. The teeth of the feed-wheel are more or less inclined, and above the upper fixed slide-plate 19 in the reservoir 14 a shaft 23 is journaled. Upon said shaft one or more (preferably two,) stirrer-wheels 24 are fixed, the said stirrer-wheels usually consisting of a hub and blades projected therefrom, as shown in Figs. 2 and 3.

In Fig. 3 it will be observed that one stirrer-wheel is located at each side of the feed-wheel, and the feed-wheel is prevented from becoming clogged by means of any suitable form of housing located above it and slotted or provided with suitable openings for the passage of material through the housing to the feed-wheel. The feed from the reservoir to the spout is regulated by moving the lower slide-plate 20 to uncover more or less of the opening $a$ in the upper slide-plate in front of the feed-wheel.

A supporting-wheel 25 is located immediately in front of the spout 16, and the axle of the supporting-wheel is journaled in brackets 26, attached to the front bar 18 of the body. The brackets 26 are preferably V-shaped, as illustrated, but may partake of any other desired contour. The spout is curved upon its forward face in order that the peripheral surface of the supporting-wheel may be placed as near thereto as possible. Upon the axle of the supporting-wheel a sprocket-wheel 27 is securely attached, which sprocket-wheel is connected by a chain belt 28 with a smaller sprocket-wheel 29, attached to one outer end of the stirrer-shaft 23, and the shaft of the feed-wheel 22, projecting at the same side of the body, is also provided with a sprocket-wheel 30, which engages with the said chain belt 28. Thus as the implement is moved forward the revolution of the supporting-wheel 25 imparts a rotary movement to both the feed and stirrer shafts.

Upon each side of the plow-beam at the end a rearwardly and downwardly extending shank 31 is secured, which shanks, when the implement is attached to a plow, extend one at each side thereof, and the lower ends of the shanks project downward at the rear of the spout of the implement and have attached thereto any suitable form of covering blade or share.

One adjustable connection between the implement and the plow-stock is effected by hinging or pivoting to the body bar or beam 18 near its ends links 32, which links are passed through the eyes of eyebolts 33, and the said eyebolts are in turn passed through longitudinal slots 34, formed in the plow-stock 11. Upon the forwardly-projecting threaded ends of the eyebolts wing-nuts 35 are screwed, or any equivalent thereof, as is best shown in Fig. 1.

It will be observed that by means of an attachment of the character above described the implement may be quickly and conveniently connected with a plow, and also that the implement is capable of a vertical self-adjustment limited only by the length of the slots in the plow-stock.

The supporting-wheel follows directly in the furrow made by the plow 13, and as the spout is immediately at the rear of the supporting-wheel the plow, wheel, and spout are in a direct line.

In Fig. 4 the connection of the plow with the implement is effected in the following manner: Angled or L-shaped pintles 36 are firmly secured in the plow-stock in such manner that one of the members of said pintles will extend upward parallel with the rear face of the stock, and eyebolts 37 are secured to the body bar or beam 18, the eyes of which bolts are adapted to receive the rear members of the pintles. The limit of the vertical self-adjustment of the implement in this form of connection is the length of the hinging-pintle.

In Fig. 5 another form of connection is illustrated, which consists of angular plates 38, secured to the rear side of the plow-stock at suitable points in its length. One member of the plates 38 is much longer than the other and extends upward parallel with and spaced some distance from the plow-stock, and these longer members of the plates have a central longitudinal slot produced therein, whereby they are divided into two sections $b$ and $b'$, as is best illustrated in Fig. 6.

T-irons 39 are secured to the beam or bar 18 of the body of the implement, and at each side of the shank of the irons a friction-roller 40 is pivoted, and the connection is effected by causing the shank of the T-irons to enter the slots in the longer members of the plates 38, whereby the friction-rollers will have a bearing upon the forward faces of the said members, as is also best shown in Fig. 6, in which it will be observed that the space between the slotted members of the plates and the opposed face of the plow-stock is of such width that the friction-rollers, while bearing against the plate, will also engage with the stock.

The form of implement just described is particularly adapted for distributing fertilizer. When the implement is to be employed for planting seed of any description, the slide-plates 19 and 20, and likewise the feed-wheel and stirrer-wheels, are omitted, and at the junction of the spout with the reservoir 14 of the body a horizontal partition 41 is constructed. Upon the partition a box-like structure 42 is erected, the said structure being within the reservoir. The box 42, preferably between its center and rear end, is provided with an opening 43, and the partition 41 between its center and forward end is provided with a like opening 44. Within the box-like structure a drop-slide 45 is held to move laterally, and the said drop-slide is provided with a single opening 46 so located that when the slide is carried rearward the opening will register with the opening 43 in the box 42, and when carried forward the said opening will register with the opening 44 in the partition 41. The sprocket-wheel in the planter is also omitted from the axle of the supporting-wheel, and in its stead a spur-wheel 47 is employed. By means of the arms of the spur-wheel motion is communicated to the drop-slide, and this is effected through the medium of a lever 48, fulcrumed near its upper end to a suitable projection from the rear of the body bar or beam 18, as is best shown in Fig. 7. The lower end of the lever is curved, so as to engage with the arms of the spur-wheel, and is pressed rearward to an engagement with the said arms by a spring 49. The upper end of the lever is pivotally connected with the pin 50, secured to the lower face of the drop-slide, which pin passes downward through a slot 51 in the partition 41 of the body. The length of stroke of the drop-slide is regulated by the length of the arms of the spur-wheel and the length of the slot 51.

In operation, when the planter is attached to the plow and the implement is drawn forward, when the lower end of the lever 48 is held between the arms of the spur-wheel by the spring 49, the drop-slide is moved to the rear and its opening registers with the opening 43 in the box 42, thus permitting the seed in the reservoir to enter the opening in the drop-slide, which extends through from top to bottom, the seed being retained in the opening by the partition 41, which constitutes a bottom therefor, and when the lever is engaged by the arms of the spur-wheel, as shown in Fig. 7, the drop-slide is moved forward to register its opening with the opening 44 in the partition 41, and the seed, dropping through the two registering openings, passes into the spout and is by said spout conducted to the ground. Immediately upon the seed being dropped it is covered by the cover-blades located at the rear of the spout.

When the form of implement utilized as a fertilizer-distributer is attached to the plow, the forward movement of the supporting-wheel causes the stirrer-shaft 23 to revolve and the stirrers carried thereby to separate the material contained in the reservoir, whereby the said material is more or less pulverized upon reaching the feed-wheel, the shaft of which wheel is also rotated by the movement of the supporting-wheel. Each tooth of the feed-wheel carries downward with it a certain quantity of fertilizer and drops the said fertilizer into the spout, which guides it to the ground. The amount of material fed to the ground is regulated by the manipulation of the sliding plate 20. The plates 19 and 20 may be detached or removed from the body at any time, and other plates may be substituted containing larger openings if a large quantity of fertilizer is to be fed downward.

The advantages of implements of the above description are apparent, as it will be readily observed that the planter may be utilized to drop seed between rows of planted corn even when grown to quite a height, and that the fertilizer may be employed to enrich the soil around the plants which are in process of cultivation, or even after regular cultivation is not necessary.

By reason of the link-connection between the implement and the plow-stock the implement is enabled to readily adjust itself to any inequalities of the ground or depth of furrow.

Having thus described my invention, I claim as new and desire to secure by Letters Patent—

1. An attachment for plows, comprising a hopper having a rearwardly and downwardly curved spout, a beam secured to the front of the hopper and extending below the same, said beam being adapted to be secured to a plow-stock, a supporting-wheel between the lower end of the beam and the spout, a feeding device in the hopper, and means for operating the feeding device from the supporting-wheel, substantially as herein shown and described.

2. An attachment for plows, comprising a hopper having a rearwardly and downwardly curved spout, a beam secured to the front of the hopper, extending below the same, and provided with rearwardly-projecting brackets on said extended portion, said beam being adapted to be secured to a plow-stock, a supporting-wheel journaled in the said brackets, a feed-wheel in the hopper, a stirrer above the feed-wheel, sprocket-wheels on the shafts of the supporting-wheel, feed-wheel, and stirrer, and a chain passing around the sprocket-wheels of the stirrer and supporting-wheel and engaging the sprocket-wheel of the feed-wheel, substantially as described.

3. The combination, with a plow-stock, of a hopper having a downwardly-curved spout, a beam secured to the hopper, means for adjustably connecting the beam to the plow-stock, a supporting-wheel immediately in front of the spout, said wheel being journaled in brackets projecting from the lower end of the beam, a feeding device in the bottom of the hopper, and intermediate mechanism between the supporting-wheel and feeding device for operating the latter, substantially as herein shown and described.

4. The combination, with a slotted plow-stock, of a hopper having a downwardly-curved spout, a beam secured to the hopper, links pivoted to the beam, eyebolts with which the links engage, passed through the slots of the plow-stock and provided with nuts, a supporting-wheel journaled in brackets projecting from the beam, a feed-wheel in the bottom of the hopper, a stirrer above the feed-wheel, sprocket-wheels on the shafts of the supporting-wheel, feed-wheel, and stirrer, and a chain passing around the sprocket-wheels of the supporting-wheels and stirrer and engaging the sprocket-wheel of the feed-wheel, substantially as herein shown and described.

WASHINGTON S. JONES.

Witnesses:
H. L. BARDWELL,
W. W. GEORGE.